United States Patent [19]

Ringdal et al.

[11] Patent Number: 5,785,454
[45] Date of Patent: Jul. 28, 1998

[54] PROTECTIVE BODY/COVER TO BE PLACED OVER DISCHARGE OPENINGS ON PIPES FOR THE UNDERGROUND SUPPLY OF WATER AND AIR

[75] Inventors: Anne-Lise Ringdal, Madeira, Portugal; Turid Ringdal Gogstad, Oslo, Norway

[73] Assignee: Madeira Invest AS, Oslo, Norway

[21] Appl. No.: 646,324

[22] PCT Filed: Nov. 11, 1994

[86] PCT No.: PCT/NO94/00181

§ 371 Date: May 13, 1996

§ 102(e) Date: May 13, 1996

[87] PCT Pub. No.: WO95/13694

PCT Pub. Date: May 26, 1995

[30] Foreign Application Priority Data

Nov. 15, 1993 [NO] Norway ..................... 934108

[51] Int. Cl.$^6$ ........................... E02B 13/00
[52] U.S. Cl. ........................... 405/45; 405/43
[58] Field of Search ..................... 405/43–49, 36

[56] References Cited

U.S. PATENT DOCUMENTS

| | | |
|---|---|---|
| 2,366,522 | 2/1945 | Gutman . |
| 2,803,948 | 8/1957 | Dorfman . |
| 4,061,272 | 12/1977 | Winston ............... 405/45 |
| 4,188,154 | 2/1980 | Izatt . |
| 4,192,628 | 3/1980 | Gorman ............... 405/45 |
| 4,245,924 | 1/1981 | Fouss et al. . |
| 4,588,325 | 5/1986 | Seefert ............... 405/43 X |
| 4,824,287 | 4/1989 | Tracy ............... 405/46 X |
| 5,074,708 | 12/1991 | McCann ............... 405/43 X |

FOREIGN PATENT DOCUMENTS 0113912   5/1986   Japan ..................... 405/48

Primary Examiner—Dennis L. Taylor
Attorney, Agent, or Firm—Browdy and Neimark

[57] ABSTRACT

A protective body/cover (1) to be placed over water/air openings on underground pipes (2). The cover is two-legged and has openings at two opposite ends to permit a pipe (2) to be passed through. Water from openings in the pipe moves towards shaped walls/projections (3), which lead the water to drip (4) through air (10) and fall to the ground (5), approximately directly under the pipe (2). The side walls on the bottom part of the cover have plates/feet (6) which prevent the pipe from sinking down into the ground. At the ends of the protective body/cover (1) there are provided slots or holes (8) with inserted pins/plates (9) which secure the pipe (2) and prevent it from being pushed down. Under the cover there will be formed an air-filled space (10) through which the water drips. Interior vertical walls (7) in the lower part of the cover (1) will be kept dry on the inside and prevent the plants' roots from growing up the wall in their search for the water source (4).

2 Claims, 1 Drawing Sheet

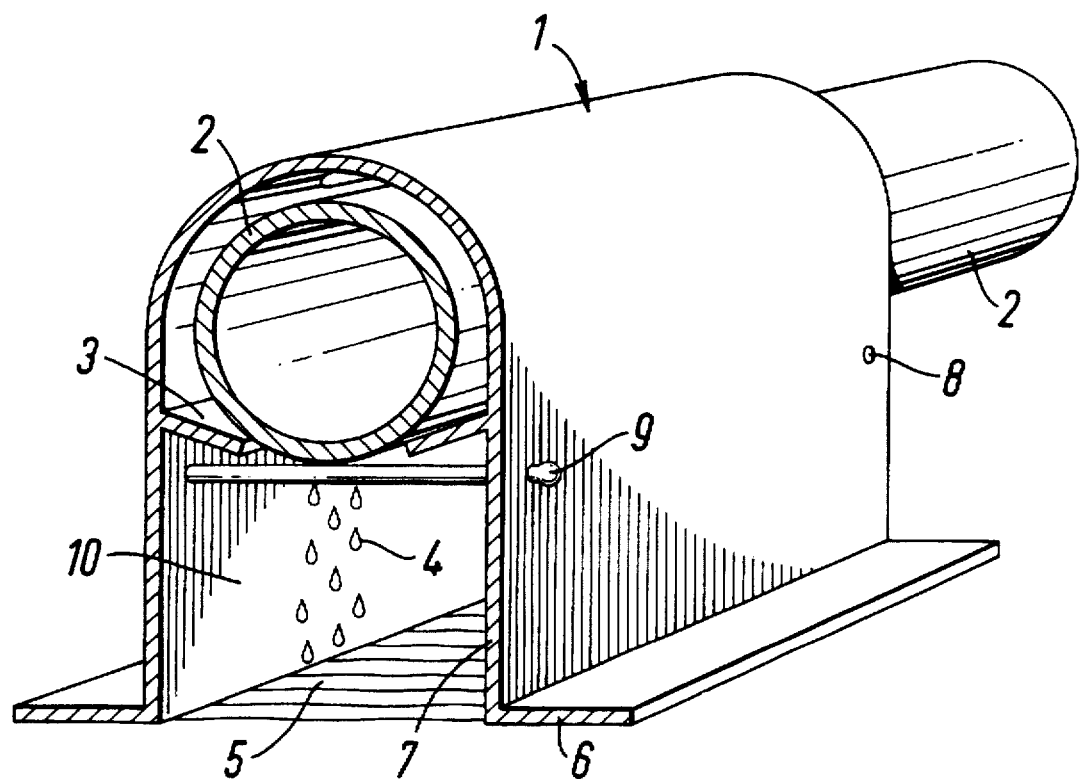

PROTECTIVE BODY/COVER TO BE PLACED OVER DISCHARGE OPENINGS ON PIPES FOR THE UNDERGROUND SUPPLY OF WATER AND AIR

FIELD OF THE INVENTION

This invention comprises a protective body/cover over water/air discharge openings on underground irrigation pipes.

DESCRIPTION OF THE RELATED TECHNOLOGY

Many experiments have been made with underground irrigation. In some cases a pipe is cut into desired lengths and opened with a longitudinal incision, thus enabling it to be pushed down over the pipe, covering the outlet opening and preventing it from being clogged with earth.

BRIEF DESCRIPTION OF THE DRAWING FIGURE

The FIGURE is a perspective view of the present invention.

DETAILED DESCRIPTION OF THE PREFERRED EMBODIMENT

This system is effective with regard to watering, but problems have arisen with respect to the roots of some plants/trees which, when they grow and search for water, move towards the pipe and grow/penetrate in between the pipe and the covering pipe part which is used. The roots tear off the covering part and small roots grow in through the outlet openings on the pipe and block them.

In this invention known, attached pipe pieces and different types of known water reservoir boxes are replaced by placing on to the pipe a two-legged protective cover which is provided in such a manner that the upper part prevents earth from being moved into the outlet opening on the pipe. The lower part of the cover has foot plates, which prevent the pipe and cover from sinking down into the ground. Vertical walls are shaped or have projections which slope in towards the middle and convey the water from the pipe inwards, thus causing it to drip through air to the ground. The inside of the lower part of the protective cover will remain dry. This prevents the plants' roots from climbing up the walls in their search for water and blocking the water/air discharge holes on the supply pipes.

The invention can be implemented in several ways. In the attached drawings 1 illustrates an embodiment of a protective body/cover which is placed over the pipe 2. On the inside there are illustrated internal projections 3 which convey drips of water 4 through air 10 to the underlying earth 5. The lower part of the protective body/cover has outwardly facing plates/feets 6 which prevent the pipe from being pressed down into the ground 5. The protective body/cover is secured to the pipe by slots or holes 8 at the ends, into which a pin or plate 9 can be inserted in order to secure the cover 1 to the pipe.

What is claimed is:

1. A protective body cover (1) to be placed over underground pipes (2) having discharge openings for supplying aerated water (4) to soil, the cover comprising:

a wall including an upper curved part spaced apart from the pipe and two legs (7) which extend downward, on either side of the pipe, to a distance from the upper curved part of approximately twice a diameter of the pipe, whereby an air pocket (10) is formed under the pipe;

the wall including, on either side of the pipe and in an area near a lower part of the pipe, a pair of projections (3) sloping inwardly and downwardly under the pipe, the projections conveying the water in drips through the air pocket to the soil approximately directly under the pipe;

wherein the pipe is supported in a correct position in relation to the cover by support elements (9) disposed through slots or holes in the wall on either side of the pipe.

2. The body cover according to claim 1, a foot plate (6) on a lower part of at least one of the vertical legs, the foot plate standing outwardly therefrom approximately at right angles.

* * * * *